Jan. 22, 1924.

C. A. AGAR

BOX LINER

Filed June 16, 1921

Inventor
Calvin A. Agar
By Attorney
Mason Fenwick & Lawrence

Jan. 22, 1924.
C. A. AGAR
1,481,333
BOX LINER
Filed June 16, 1921  2 Sheets-Sheet 2
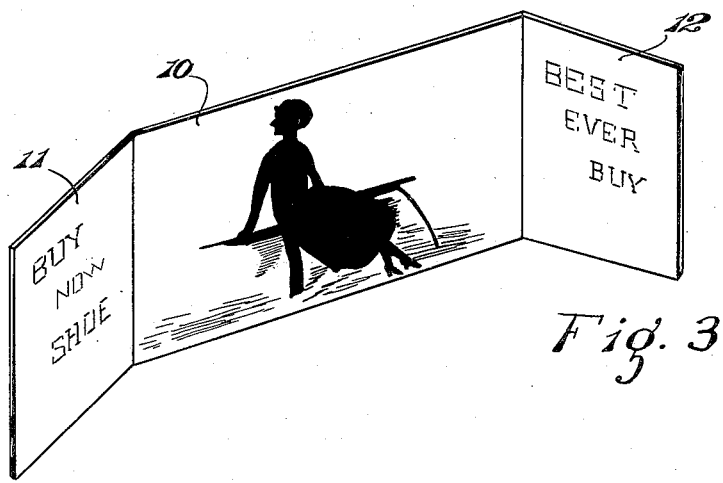
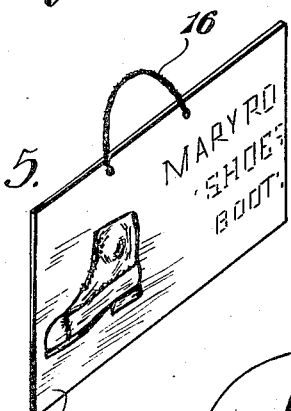
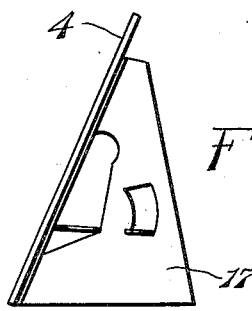
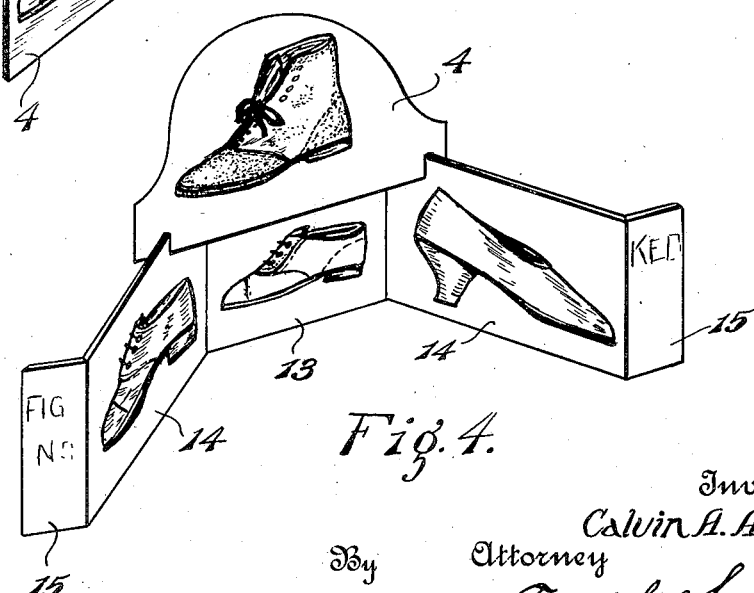

Patented Jan. 22, 1924.

1,481,333

UNITED STATES PATENT OFFICE.

CALVIN A. AGAR, OF WEST ORANGE, NEW JERSEY.

BOX LINER.

Application filed June 16, 1921. Serial No. 478,038.

*To all whom it may concern:*

Be it known that I, CALVIN A. AGAR, a citizen of the United States, residing at West Orange, in the county of Essex and State of New Jersey, have invented certain new and useful Improvements in Box Liners; and I do hereby declare the following to be a full, clear, and exact description of the invention, such as will enable others skilled in the art to which it appertains to make and use the same.

The rulings of the official classification committee on freight shipments as well as the rules of the express companies provide that where glass or other fragile articles such as jugs, tin cans, etc., empty or filled are packed in corrugated fibre boxes that partition cells, pads and liners made of corrugated fibre board must be employed, except in certain instances where pads may be eliminated. Furthermore the above described interior packing or portions of it are frequently used by shippers as an additional packing protection although not so prescribed by the present rules of the transportation carriers. These corrugated fibre pads must be made so that they will completely fill the entire space at the top and bottom of the box, and the liners must be made so as to completely cover the sides and the ends of the box. Heretofore, such pads and liners have been an additional expense to the shipper and of no utility aside from the requirements of the transportation companies in shipping the goods.

It is one object of the present invention to provide pads and liners which will have an additional utility, or function other than merely reinforcing the box; to provide pads and liners which may be employed as display cards or devices by the receiver of the goods; to adapt the display devices to the shape of the pads and liners; to utilize the box as a carrier for the display devices to prevent their injury; to secure simplicity of construction, attractiveness of appearance and a display device readily set up, and to obtain other advantages and results as may be brought out in the following description.

Referring to the accompanying drawings in which like numerals of reference indicate the same parts throughout the several views:

Figures 3 and 4 are perspective views of a pad and side liner showing a different method of display; and Figures 5 and 6 are a perspective view and an edge view respectively showing ways of utilizing the top and bottom pads of the box, or portions of the liners.

Figure 1:
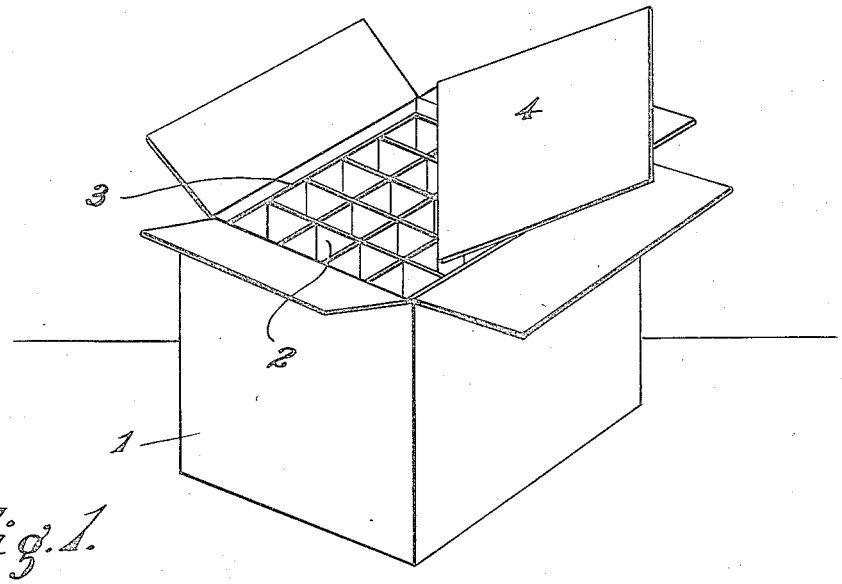
Figure 1 is a perspective view of a box with its top open and the upper pad laid out to disclose the interior of the box and the liner for the sides positioned therein.

In the specific embodiment of the invention illustrated in said drawing, the reference numeral (1) indicates the box in which the shipper proposes to send his goods. This box is suitably divided off with partition cells (2), and is also provided with liners (3) and top and bottom pads (4).

Figure 2:
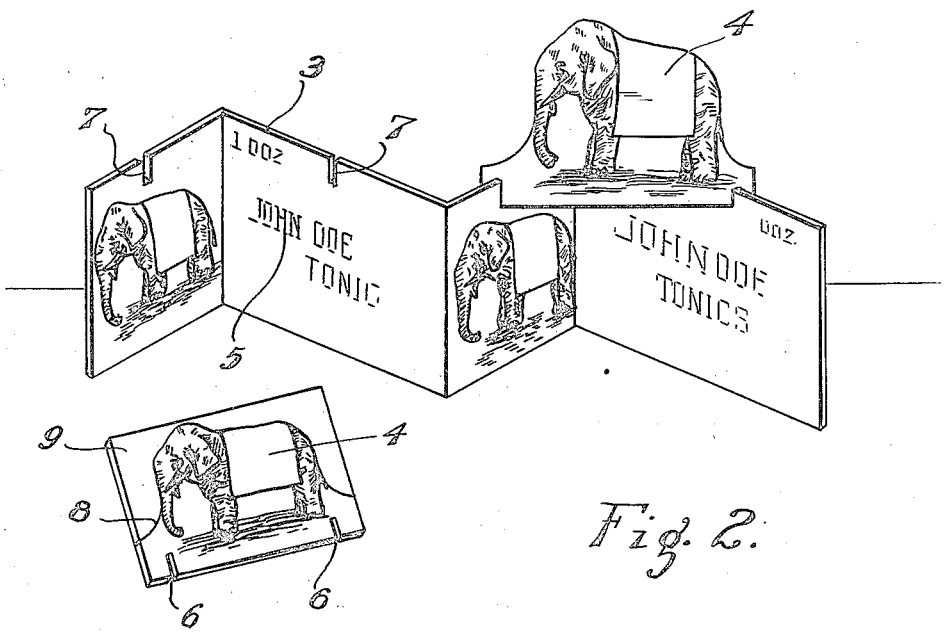
Figure 2 is a perspective view of the pads and liner removed from the box and partially set up.

In accordance with the present invention the liners (3) and pads (4) are provided with advertising matter thereon and arranged and adapted to be used by the receiver of the goods for advertising purposes. As illustrative of this feature of the invention the liner (3) is shown in Figure 2 as being separable at one corner so it may be stretched out and stood upon a counter or showcase, or elsewhere. Upon the liner is shown suitable advertising matter (5). In order to also utilize the pads the same may be employed to span between the sections of the side liner, as clearly shown at the right of Figure 2. The pads are preferably notched as at 6 to engage in similar notches (7) in the liner to enable the proper retention of the pads in upright position upon the section of the side liner. These notches will not interfere at all with the use of the liners as packing for the box. Likewise the pads or liners may be partially cut, perforated or otherwise arranged so that the receiver of the box may readily tear away the portion of it which is not desired. For instance, in Figure 2 the pad is shown showing a picture of an elephant, and the pad which has been put in position shows the same as having been cut away following the outline of the elephant. The pad which has not yet been put in position shows the same intact, but partially cut on the line 8 so it will be simple for the receiver to tear away the portion 9 and then position the remaining part of the pad upon the liner. Advertising matter may be printed directly on the pads and liners, or printed, lithographed or otherwise impressed on paper, cloth or other material and attached to the surface of the liners or pads, so as to cover all or part of the surfaces.

Where it is desired to make several display devices for distributing around the store or in the showcase, the liner may be divided into a greater number of parts, and in Figure 3 I have shown such part utilized as a display device, the same having only three sections 10, 11 and 12. The liner may be further utilized by dividing into several parts as shown in Figures 5 and 6.

It is also deemed within the scope of the present invention to divide the liner otherwise than just at a corner as shown in Figure 2, and therefore for illustrative purposes I have shown the liner divided in the middle of one of the side sections. This accordingly results in the display having a middle section 13, similar flaring sections 14, and wings 15, thus giving a very symmetrical and pleasing appearance to the display device. As in the construction already described, the pad (4) may be employed as a span between the flaring sections 14—14, the parts being suitably notched for that purpose.

A portion of the liners or a pad may be employed in a great variety of ways, one of which is shown in Figure 5 as a display card having a string or support 16 by which it may be hung up, or a portion of the liner section may have an easel (17) attached thereto as shown in Figure 6, this easel merely being another manner of support for the liner section to properly display the advertising matter thereon.

Obviously other detail changes and modifications may be made in the construction and use of my invention, and I do not wish to be understood as limiting myself except as required by the following claims when construed in the light of the prior art.

Having thus described my invention, I claim:—

1. In combination with a box, a liner for said box having advertising matter thereon, a pad for said box also having advertising matter thereon, said liner being arranged and adapted to stand on edge for advertising purposes and the pad arranged and adapted to span sections of the liner to cooperate therewith for advertising purposes.

2. In combination with a box, a removable liner and pad therefor, said liner and pad having advertising matter displayed thereon and being so constructed that the several parts when removed from the box will cooperate and interlock to form an advertisement for the goods in said box.

In testimony whereof I affix my signature.

CALVIN A. AGAR.